Feb. 24, 1942.  A. R. POOL  2,274,380
CASTING FLOAT
Filed March 12, 1941

Inventor
Austin R. Pool
By Thorpe & Thorpe
Attorneys

Patented Feb. 24, 1942

2,274,380

UNITED STATES PATENT OFFICE 2,274,380

CASTING FLOAT

Austin R. Pool, Wetmore, Kans.

Application March 12, 1941, Serial No. 382,853

9 Claims. (Cl. 43—49)

This invention relates to fishing and casting floats and has for its chief object to produce a casting float which can be moved down close to the casting weight to prevent entanglement of the line when casting, the float being so constructed that when it strikes the water, the weighted line will run down through the float until the weight strikes the bottom. The fisherman can then, by successive jerks on the line elevate the weight and its adjacent hooks above the bottom and by observation can thus set his hooks to fish at any desired depth. With this arrangement snagging of the hooks and bait along the bottom or the burying of the bait in a muddy bottom, may be entirely obviated.

Another object of the invention is to produce a float of the general character set forth in which automatic line lock means are provided to prevent the movement of the float upwardly along the line which would result in a change in fishing depth and sometimes results in the hooks dragging the bottom.

A further object of the invention is to produce a float of the general character outlined which is of strong, durable, simple and inexpensive construction; and in order that it may be fully understood, reference is to be had to the accompanying drawing, in which.

Figure 1:
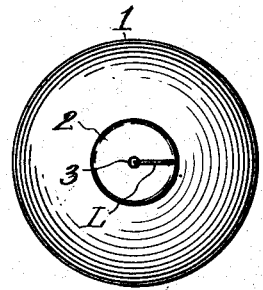
Figure 1 is a top plan view of the float and line as they appear in Figure 4.
Figure 2:
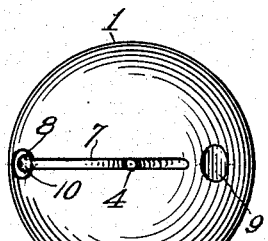
Figure 2 is a bottom plan view of the float, the line being omitted, as it appears in Figure 4.
Figure 3:
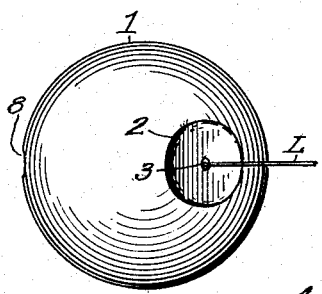
Figure 3 is a top plan view of the float and line as they appear in Figure 6.
Figure 4:
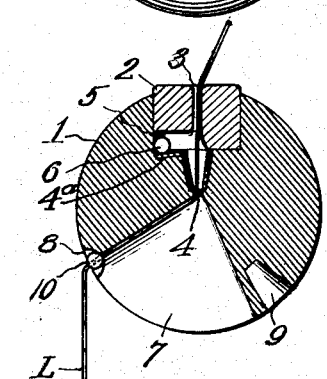
Figure 4 is a central vertical section through the float with the float and line in the positions they occupy when a cast is to be made.

In the said drawing, where like reference characters identify corresponding parts in all of the figures, 1 is a buoyant float body, and although it is shown as of spherical shape, it may be of any desired configuration within the range of operative capacities as will hereinafter appear. For convenience, the upper end of the float is shown as fitted with a plug 2. Considering the plug 2 as a part of the float body 1, it will be noted that the float is provided with a radially extending passageway 3, which, at about the center of the float, is restricted or constricted to receive an inverted conical sleeve 4 having an ear 4a at its larger end constituting the floor of an offset chamber or recess 5. Loosely received within and normally resting on the floor 4a of the chamber 5 is a ball 6. This ball is adapted to be moved, as will hereinafter appear, into and out of the chamber 5 and conical sleeve 4. The conical sleeve 4 and its ear 4a are essential only in those cases where the material used to make the body of the float is such as to tend to impede freedom of movement of the ball 6 as will hereinafter more clearly appear.

Figure 6:
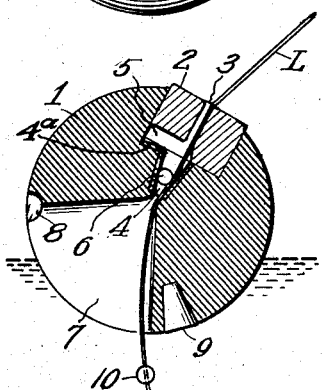
Figure 6 is a central vertical section through the slot and line in the position the parts occupy when the weight is resting on the bottom.
Figure 7:
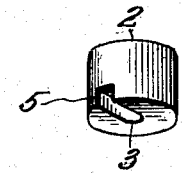
Figure 7 is a perspective view of a filler guide plug as used in the embodiment of float here depicted.
Figure 8:
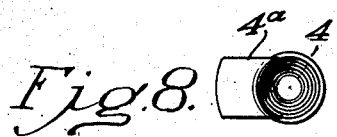
Figure 8 is a top plan view of a liner or conical seat member which may be used in the embodiment of float herein depicted.

The lower end of the restricted passageway 4 communicates with a slot 7 of substantial extent, and somewhat greater in width than the diameter of the fishing line L so that the line may swing, as a pendulum, back and forth within the slot 7. One end of the slot 7 terminates in a semi-circular recess 8 for a purpose which will hereinafter appear. The float 1 is cast or weighted, or otherwise formed, as by having an embedded weight 9, so that the floating position of the float when unrestrained or unaffected by outside influences, will be as shown in Figure 6, the weight 9 being down as indicated to tip or spill ball 6 out of chamber 5 into the passageway 4.

Figure 5:
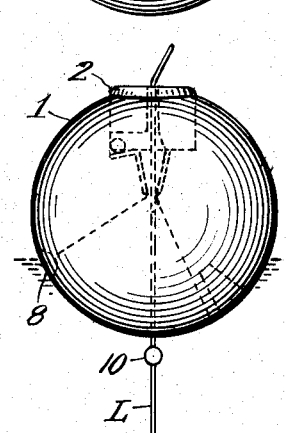
Figure 5 is a side elevation of the float as it rests on the water before the weight has reached the bottom.

The fishing line L is provided with a fixed bead or the like 10 spaced above the hook 11 and end weight 12. When the line is cast, it is pulled through the float 1 to seat the bead in the recess 8. This insures that in the casting operation, the ball 6 rests in its offset chamber 5 so that when the float strikes the water, the weight 12 will start to run to the bottom and pull the line L through the float 1, the pull of said line and weight insuring that during this operation the float occupies the position shown in Figure 5 with the ball 6 within its chamber or recess 5.

Finally the weight 12 rests on the bottom and the float 1 is relieved of its weight. When this occurs the line L goes slack between the weight 12 and the float as shown in Figure 6, and the float 1 immediately oscillates in the water under the effect of its off center weight 9, until the float appears as shown in Figure 6. This radial oscillation of the float is insured because the slot 7, chamber 5, and weight 9 are capable of bisection by a single plane, the result being that the ball 6 is discharged out of chamber 5 into conical passage 4 ready to lock the line L should it tend to move downwardly through the float. When the parts are in the position shown in Figure 6 it will be apparent that the line L is locked against further downward movement through the float by the jambing action of the ball 6 on the line within the inverted cone 4. The fisherman, by a series of quick jerks on the line, can raise the weight 12 and the hook 11 to any desired fishing depth, the ball 6 retreating to allow this movement of the line and then immediately reseating in locking position. A continuous pull on the line as when reeling in the hook will raise the hook and weight from the bottom faster than the float will overcome the resistance of the water so there will be no chance of fouling the bottom.

From the above description it will be apparent that I have produced a construction embodying all of the features of advantage set forth as desirable, and while I have described and illustrated the preferred embodiment it will be understood that I reserve the right to all changes within the spirit and scope of the appended claims.

I claim:

1. A float comprising a buoyant body having a through passageway, a line extending through said passageway, a gravity operated lock moved into and out of line contact in response to changes in buoyant stability of the float, a weight on said line to insure predetermined buoyant stability of the float when the weight is suspended therefrom by the line, and a second weight associated with the float to oscillate the float and change its buoyant position when the float is relieved of the load of the first-named weight.

2. A float comprising a buoyant body having a through passageway, a line extending through said passageway, a ball within the passageway for locking the line against movement in one direction, a weight on said line to insure predetermined buoyant stability of the float when the weight is suspended therefrom by the line, and a second weight associated with the float to oscillate the float and change its buoyant position when the float is relieved of the load of the first-named weight.

3. A float comprising a buoyant body having a through passageway and a chamber offset from said passageway and communicating therewith, a line extending through the passageway, a line lock to move to and from positions within the chamber and passageway, a weight on the line to insure predetermined buoyant stability of the float when the weight is suspended therefrom by the line, and a second weight associated with the float to oscillate the float and change its buoyant position when the float is relieved of the load of the first-named float.

4. A float comprising a bouyant body having a through passageway and an offset chamber communicating therewith, a line extending through said passageway, a ball movable to and from positions in the chamber and passageway, a weight on said line to insure predetermined buoyant stability of the float when the weight is suspended therefrom by the line, and a second weight associated with the float to oscillate the float and change its position of buoyant stability when the float is relieved of the load of the first-named weight.

5. A float comprising a buoyant body having a through passageway and a chamber offset from said passageway and communicating therewith, and a ball movable out of said chamber into the passageway, said float being weighted to have buoyant stability at such an angle as to gravitatively discharge the ball from the chamber into the passageway.

6. A float comprising a buoyant body having a through passageway and a chamber offset from said passageway and communicating therewith, line locking means associated with the chamber and passageway, a weight in said float, said weight and chamber being capable of bisection by a single plane passing through the float.

7. A float comprising a buoyant body having a through passageway and a chamber offset from said passageway and communicating therewith, said passageway at one end flaring into a slot, line locking means associated with the chamber and passageway, and a weight in said float, said chamber, slot and weight being capable of bisection by a single plane passing through the float.

8. A float comprising a buoyant body having a passageway through a portion of its body, said passageway opening into a flaring slot through the balance of said body, a line extending through the passageway and slot, and a weight on said float to maintain the float in a predetermined position of buoyant stability.

9. In a float comprising a buoyant body having a passageway through a portion of the body, said passageway opening into a flared slot through the balance of the body, a weighted line extending through the passageway and slot and adapted to maintain the float in predetermined position of buoyant stability when the float is loaded by said line, and a weight on the float for rocking the float when the float is relieved of the line load.

AUSTIN R. POOL.